United States Patent [19]
Parkhe

[11] Patent Number: 5,370,775
[45] Date of Patent: Dec. 6, 1994

[54] FORMATION OF CHEMICALLY REDUCED ELECTRODE LAYERS

[75] Inventor: V. D. Parkhe, Edison, N.J.

[73] Assignee: Sun Active Glass Electrochromics, Inc., Valley Cottage, N.Y.

[21] Appl. No.: 866,603

[22] Filed: Apr. 10, 1992

[51] Int. Cl.$^5$ .............................. C25F 5/00; G02F 1/01
[52] U.S. Cl. ...................................... 204/140; 204/242; 359/265
[58] Field of Search ................ 204/242, 140; 359/273, 359/265, 269

[56] References Cited

U.S. PATENT DOCUMENTS

| | | | |
|---|---|---|---|
| 4,231,641 | 11/1980 | Randin | 204/242 |
| 4,498,739 | 12/1985 | Itaya et al. | 204/290 R |
| 4,830,471 | 5/1989 | Demiryont | 350/357 |
| 5,019,420 | 5/1991 | Rauh | 350/357 |
| 5,099,356 | 3/1992 | Ohsawa et al. | 359/270 |
| 5,122,896 | 6/1992 | Mizusaki et al. | 359/269 |
| 5,138,481 | 8/1992 | Demiryont | 359/269 |

FOREIGN PATENT DOCUMENTS 2096786 10/1982 United Kingdom ............... 359/269

*Primary Examiner*—John Niebling
*Assistant Examiner*—Kishor Mayckar
*Attorney, Agent, or Firm*—Lerner, David, Littenberg, Krumholz & Mentlik

[57] ABSTRACT

Processes for forming stable electrodes for use in electrochromic devices are disclosed including a stable electrode, a second electrode, and an ion-conducting layer therebetween, the processes include placing the stable electrode in an ion-conducting solution, placing a source of ions capable of chemically reducing the stable electrode in the ion-conducting solution, causing the ions and associated electrons to migrate to and chemically reduce the stable electrode, and forming an ion-conducting layer on the stable electrode from the ion-conducting solution.

16 Claims, 2 Drawing Sheets

FORMATION OF CHEMICALLY REDUCED ELECTRODE LAYERS

BACKGROUND OF THE INVENTION

This invention relates to electrochromic devices for the control and modulation of light transmission, absorption and reflection, and more particularly to the formation of chemically reduced electrode layers for such devices.

Electrochromic devices employ materials with alterable optical properties, for example reversibly, in response to an applied potential. The process involves the simultaneous insertion or extraction of electrons and charge compensating ions. Electrochromic materials and devices are used in, for example, display devices, variable reflectance mirrors, and in the future as windows with controlled light transmission.

In general, electrochromic devices have a composite structure for which the transmittance of light can be varied in response to an applied electrical potential. The composite includes a variably transmissive electrochromic layer, i.e. electrode, that can be normally colorless, but becomes colored when chemically reduced by the insertion of electrons and charge compensating ions. The coloration involves absorption, reflectance or a combination of both.

The composite device also can include a counterelectrode, which can serve as a complementary electrochromic layer. The counterelectrode is either optically passive when chemically oxidized or reduced, i.e. is non-electrochromic, or is colored when oxidized and colorless when reduced, thus forming a complement with the first electrochromic layer. The oxidation and reduction of an electrochromic counterelectrode also occurs by electron injection and insertion of the same charge compensating ions as for the first electrochromic layer. The charge compensating ions are transported by an ion conducting layer, e.g., an electrolyte, that is electron blocking and separates the two electrodes.

The operation of an electrochromic device in which the primary electrochromic layer is tungsten trioxide ($WO_3$), the counterelectrode is vanadium pentoxide ($V_2O_5$), and lithium ions ($Li^+$) are transported is illustrated in accordance with reaction (1), below.

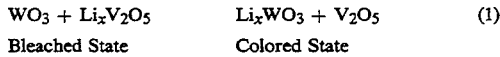

$$WO_3 + Li_xV_2O_5 \quad\quad Li_xWO_3 + V_2O_5 \quad\quad (1)$$
Bleached State  Colored State "x" is a stoichiometric parameter greater than "0" and less than "0.5"

Coloration is accomplished by the transfer of lithium (Li) from $V_2O_5$ to $WO_3$. Assuming that $V_2O_5$ is the limiting electrode and that sufficient $WO_3$ is present to accept all of the available lithium (Li), the dynamic optical range of the device will be determined by the amount of Li present.

The inserting species, for example lithium is introduced during fabrication of the electrochromic device. This can be accomplished by several methods, including the direct vapor deposition of the counterelectrode with the inserting species, for example, $Li_xV_2O_5$, the chemical reduction of the counterelectrode by elemental lithium in a separate processing step, or by electrochemical reduction in an electrolytic solution of lithium ions ($Li^+$).

Alternatively, the lithium may be introduced initially into the primary electrochromic layer, for example $Li_xWO_3$. Or the lithium may be distributed between both electrodes, with the resulting structure in an intermediate state of coloration.

In a large area film processing, vapor deposition is widely used, so that the multiple layers of the structure can be deposited in-line on a continuous basis, as by using a series of vapor box coaters. For even coating of relatively large glass or plastic surfaces, in architectural and vehicular applications, sputtering is presently an industry standard.

In order to fabricate an electrochromic device by vacuum processing, such as by sputtering, the layers are deposited in Sequence, one on top of the other. For the high sputter rates needed for economical processing of large areas, sputtering sources with a good electrical conductivity are preferred.

Since the component layers of electrochromic devices are oxides, they are generally deposited in an oxidizing atmosphere, such as in pure oxygen $O_2$, a mixture of argon and oxygen $Ar/O_2$, or a mixture of oxygen and moisture $O/H_2O$. Consequently, the layers are reactively sputtered from targets of the parent metals. On the other hand, the insertion atom, such as lithium, must be deposited in a reducing or inert atmosphere. The resulting compounds, $Li_xV_2O_5$ and/or $Li_xWO_3$, for example, are easily oxidizable.

In subsequently fabricating an oxide ion conducting layer on top of a reduced electrochromic layer, such as $Li+$ conducting glass of lithium silicate $Li_4SiO_4$ or lithium-alumino silicate $LiAlSiO_4$, it is necessary to have exposure to an oxidizing atmosphere, with potentially adverse effects.

In some cases an attempt to avoid the adverse effects has been made by converting $WO_3$ to $Li_xWO_3$ by vacuum deposition, then capping the converted material with an ion conductor.

It is an object of the invention to provide for reducing an electrochromic layer, and then adding an ion conducting oxide without oxidizing the electrochromic layer. These two acts are accomplished concomitantly. Subsequent layers may then be deposited without significantly oxidizing the reduced electrochromic underlayer.

A further object is to avoid depletion of inserted ions in electrochromic layers during subsequent processing steps Another object of the invention is to eliminate the need for a "capping" layer on the reduced electrochromic layer in order to avoid any subsequent oxidation of the electrochromic layer.. A related object is to eliminate any reduction in ionic conductivity associated with the use of a capping layer.

Yet another object is to avoid the occurrence of spontaneous coloration during the ion-conducting layer formation which tends to deplete the ion-conducting layer of insertion atoms. The result of such depletion can reduce the ionic conductivity of the ion conducting layer or possibly even form an ion-blocking layer at the interface between the electrochromic electrode layer and the ion conducting layer, or between the interface of the counter-electrode layer and the ion-conducting layer.

Still another object is to avoid the objections associated with the evaporation of $Li_3N$ on $WO_3$, giving rise initially to dry injection of the Li to form $Li_xWO_3$, with the evolution of nitrogen gas $N_2$. A related object is to avoid the build-up of a lithium nitride Li$_3$N ion conductor on WO$_3$.

A further object is to avoid the problems associated with Li$_3$N, including red coloration and ease of oxidation on deposition of contiguous counterelectrode and conductive oxide layers.

SUMMARY OF THE INVENTION

In accomplishing the foregoing and related objects, the invention provides a process for forming a stable electrode in contact with an ion conductor by (A) placing an electrode in an ion conducting solution; (B) placing a source of atoms for chemically reducing the electrode in the ion conducting solution; and (C) causing atoms from the source to migrate to, and chemically reduce, the electrode.

In accordance with one aspect of the invention, a short circuit is made between the electrode and the source of the insertion atoms. The electrode is of a material capable of serving as a primary electrochromic electrode or as the counterelectrode of the primary electrochromic layer. The source is made up of, or contains, atoms capable of reducing the electrode by injecting the atoms into the electrode in ionic form. An electron is supplied by the external short- circuit mentioned above. A suitable source, for example, is an anode of lithium or, an alloy thereof, capable of ion injection into the electrode.

In accordance with a further aspect of the invention, a permeable membrane isolates the source from the electrode and from the solution from which the ion-conductor layer is made. The membrane is permeable to lithium ions but is impermeable to alcoholic containing, ion-conducton film solutions into which the electrode is inserted, and from which the ion-conductor layer is formed.

In accordance with another aspect of the invention a variable source of direct current potential and a current limiting resistor interconnects the source and the electrode.

Apparatus in accordance with the invention for injecting ions into an electrode includes an ion-conducton film formation solution, and its chamber into which the electrode is inserted. A source is inserted into the chamber to supply atoms to chemically reduce the electrode.

DESCRIPTION OF THE DRAWINGS

Other aspects of the invention will become apparent after considering several illustrative embodiments taken in conjunction with the drawings, in which.

DETAILED DESCRIPTION

Figure 1:
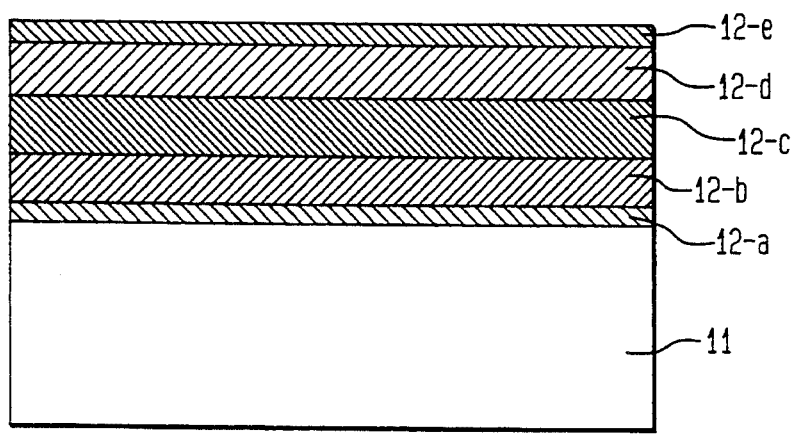
FIG. 1 is a cross sectional view of an electrochromic device.

With reference to the drawings a device 10 in accordance with the invention is shown in FIG. 1. The device 10 includes a substrate 11, illustratively of glass or other transparent material upon which are deposited successive layers constituting an electrochromic device 12 for providing a desired electrochromic effect. The various layers 12-a through 12-e of the electrochromic device 12 include a transparent electrical conductor 12-a, illustratively of indium-tin-oxide (ITO); a primary electrochromic layer 12-b such as lithium tungstenate; a solid ion conductor 12-c of, for example, a mixture of lithium oxide and silicon dioxide; a counterelectrode 12-d, of, for example, vanadium pentoxide. In FIG. 1, the electrochromic device 12 also includes an upper transparent electrical contact 12-e, which also may be of indium tin oxide, similar to the lower transparent electrical conductor 12-a.

It will be appreciated that the electrode layers 12-b and 12-d may be reversed in the overall structure of FIG. 1. In the manufacturing process the primary electrochromic layer 12-b is initially deposited in its fully oxidized form as tungsten trioxide. However, in order for the electrochromic layer 12-b to be capable of injecting ions, for example of lithium or other insertion form into the electrochromic layer 12-b, it is necessary to convert the layer 12-b into reduced form, creating for example, lithium tungstenate.

In the prior art of, for example, U.S. Pat. No. 5,019,420 which issued May 28, 1991 to R. David Rauh on assignment to EIC Laboratories, Inc., of Norwood, Mass., the injection of the insertion atom into the electrochromic layer 12-b is accomplished by depositing an ion conducting layer 12-c which converts the electrochromic layer 12-b, on contact, to its reduced state. Illustratively the ion conducting layer is a lithium silicon alloy which is converted to a lithium depleted silicon layer. Unfortunately, the amount of the interfacial layer required to provide the needed insertion atoms is sufficiently small that the interfacial oxide may have a relatively low ionic conductivity.

Figure 2:
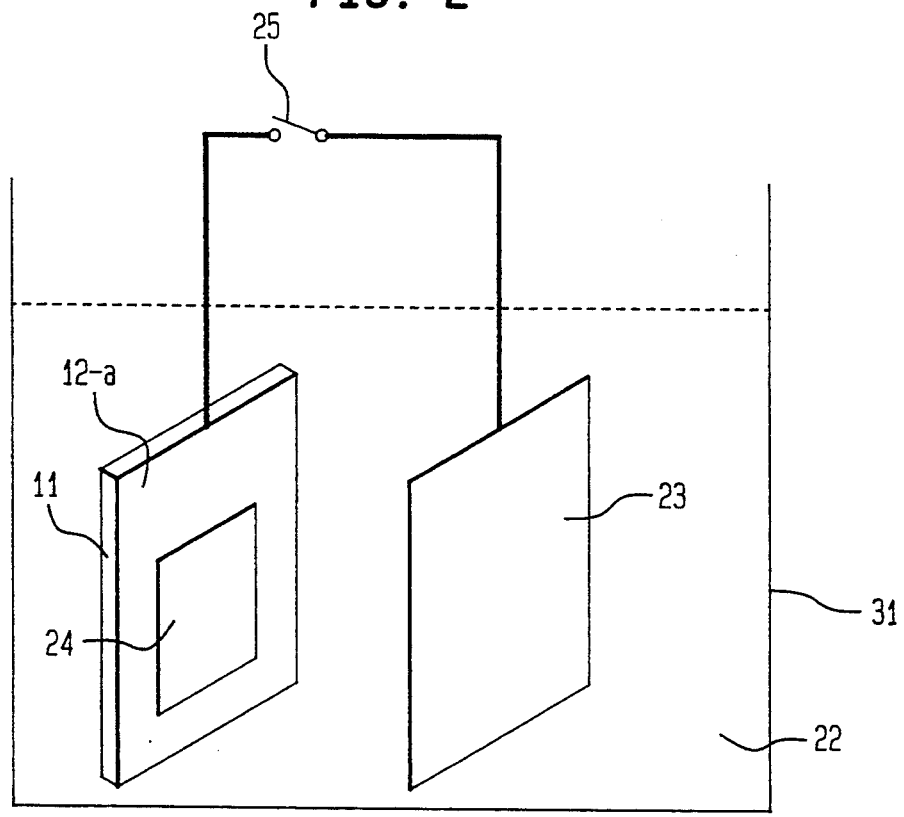
FIG. 2 is a schematic diagram illustrating the insertion of charge compensating ions in accordance with the invention.

The invention, however, overcomes the difficulties experienced in the prior art by the electrolytic arrangement shown in FIG. 2 in which an electrolytic chamber 21 with an ion conducting solution 22 has inserted electrodes 23 and 24. The electrode 24 includes the substrate 11 with overlying layers 12-a of indium tin oxide and an electrode layer 24, which can be the primary electrode of tungsten trioxide or the counterelectrode of vanadium pentoxide. The second electrode 23 is a lithium anode. The reduction of the electrode 24 then takes place by electrolysis from the lithium anode 23 through a sol-gel ionic conductor 22 in which the electrodes 23 and 24 are placed. In the embodiment of FIG. 2, the electrodes 23 and 24 are joined above the electrolyte 22 by a shorting segment 25.

Figure 3:
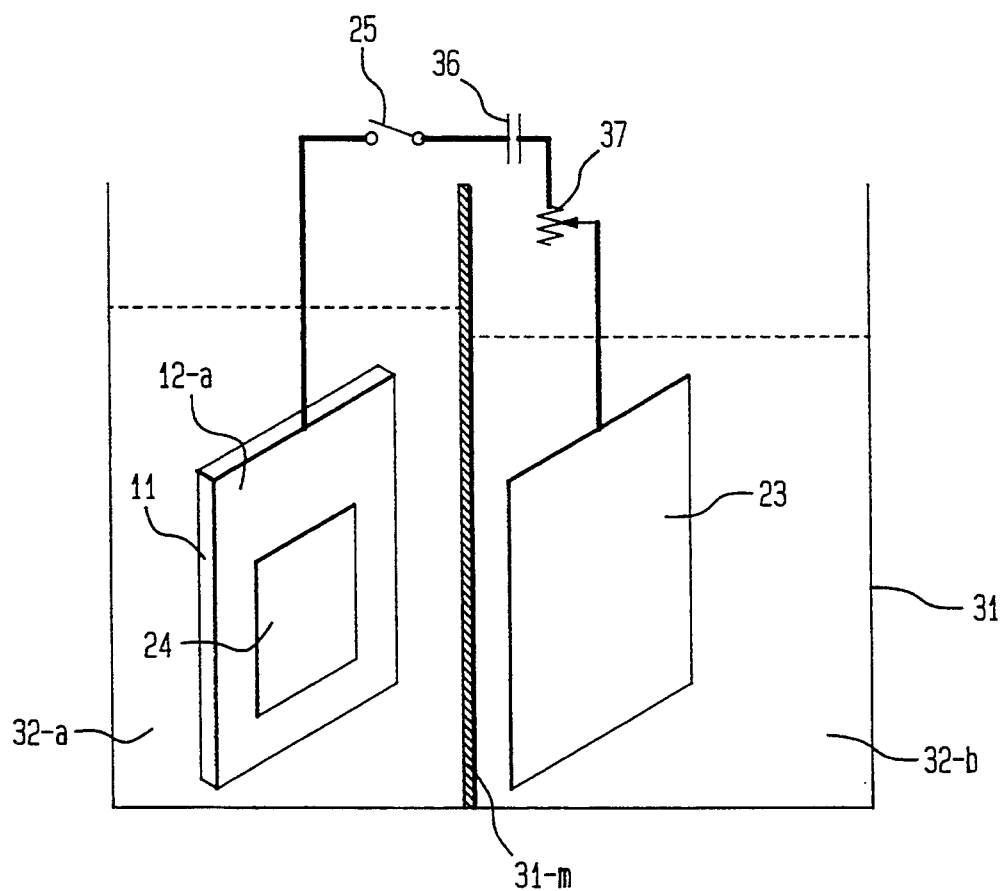
FIG. 3 is a modification of the process of FIG. 2 showing the employment of a membrane separator that is used to prevent contamination of the solution used in the formation of thin films in accordance with the invention.

In the alternative embodiment of the invention shown in FIG. 3, the electrolytic arrangement 30 includes an electrolytic chamber 31 with a membrane separator 31-m that is permeable to the ions to be injected, but is impermeable to the ion conducting solution 32. In addition, to promote the reaction the shorting segment 25 of FIG. 2 is replaced by a variable potential source taking the form of an adjustable battery 36 and a variable current limiting resistor 37.

In a further embodiment of the invention, a tube of, for example, lithium-beta-alumina is substituted for the 31-m.

Other aspects of the invention will be apparent to those of ordinary skill in the art.

What is claimed is:

1. A process for forming a stable electrode for use in an electrochromic device including a first electrode comprising said stable electrode, a second electrode, and an ion-conducting layer therebetween, said process comprising placing said first electrode in an ion-conducting solution capable of providing said ion-conducting layer, placing a source of ions capable of chemically reducing said first electrode in said ion-conducting solution, causing said ions and associated electrons to migrate to and chemically reduce said first electrode, and forming said ion-conducting layer on said first electrode from said ion-conducting solution.

2. The process of claim 1 wherein said first electrode is electrochromic.

3. The process of claim 1 wherein the step of causing said ions and associated electrons to migrate to and chemically reduce said first electrode comprises creating a short circuit between said first electrode and said source of ions.

4. The process of claim 3 wherein said creating of said short circuit is carried out outside of said ion-conducting solution.

5. The process of claim 1 wherein said first electrode comprises a counterelectrode.

6. The process of claim 1 wherein said source of ions capable of chemically reducing said electrode comprises an anode of lithium or an alloy thereof.

7. The process of claim 1 further including interposing a permeable membrane of lithium-beta-alumina between said source of ions and said first electrode.

8. The process of claim 7 wherein said membrane is permeable to said ions but is impermeable to said ion-conducting solution.

9. The process of claim 8 wherein said ions comprise lithium ions.

10. The process of claim 1 further including interconnecting said source of ions and said first electrode with a variable source of direct current potential and a current limiting resistor.

11. Apparatus for injecting ions into an electrode for use in an electrochromic device including a first electrode, a second electrode, and an ion-conducting layer therebetween, said apparatus comprising an electrolytic chamber containing said first electrode and an ion-conducting solution capable of providing said ion-conducting layer onto the first electrode, a source of ions capable of chemically reducing said first electrode, said source of ions inserted into said ion-conducting solution, and migration means for causing said ions and associated electrons to migrate to and chemically reduce said first electrode.

12. The apparatus of claim 11 further including a membrane of lithium-beta-alumina inserted in said electrolytic chamber between said source of ions and said first electrode.

13. The apparatus of claim 11 wherein said first electrode comprises an electrochemical layer.

14. The apparatus of claim 11 wherein said first electrode comprises a counterelectrode.

15. The apparatus of claim 11 wherein said source of ions comprises a lithium anode.

16. The apparatus of claim 11 wherein said ion-conducting solution comprises an alcoholic solution.

* * * * *

UNITED STATES PATENT AND TRADEMARK OFFICE
CERTIFICATE OF CORRECTION

PATENT NO. : 5,370,775
DATED : December 6, 1994
INVENTOR(S) : V. D. Parkhe

It is certified that error appears in the above-identified patent and that said Letters Patent is hereby corrected as shown below:

Column 2, line 23, delete "O/H$_2$O" and insert therefor --O$_2$/H$_2$O--.
line 32, delete "LiAlSiO$_4$" and insert therefor --LiAlSiO$_4$--.
Column 6, line 24, delete "electrochemical" and insert therefor --electrochromic--.

Signed and Sealed this

Seventh Day of March, 1995

Attest:

BRUCE LEHMAN

Attesting Officer

Commissioner of Patents and Trademarks